(12) United States Patent
Armstrong et al.

(10) Patent No.: US 10,888,198 B2
(45) Date of Patent: Jan. 12, 2021

(54) SCOOP WITH SPRING ACTION HANDLE

(71) Applicants: Nathaniel Armstrong, Centerville, TN (US); Andrew John Lafferty, Jr., Centerville, TN (US)

(72) Inventors: Nathaniel Armstrong, Centerville, TN (US); Andrew John Lafferty, Jr., Centerville, TN (US)

( * ) Notice: Subject to any disclaimer, the term of this patent is extended or adjusted under 35 U.S.C. 154(b) by 7 days.

(21) Appl. No.: 16/410,849

(22) Filed: May 13, 2019

(65) Prior Publication Data

US 2020/0359844 A1 Nov. 19, 2020

(51) Int. Cl.
*A47J 43/28* (2006.01)

(52) U.S. Cl.
CPC .................. *A47J 43/28* (2013.01)

(58) Field of Classification Search
CPC ........ A47J 43/28; G01F 19/002; G01F 19/00; A47F 13/08; A47G 21/00; A47G 21/04; A47G 21/10
USPC ................ 222/460, 461; 73/426, 429, 427
See application file for complete search history.

(56) References Cited

U.S. PATENT DOCUMENTS

| | | | | |
|---|---|---|---|---|
| 66,492 A * | 7/1867 | Hellen | ............. | B65G 7/12 294/16 |
| 544,398 A * | 8/1895 | Ackerman | ............. | G01F 19/00 73/429 |
| 1,175,709 A * | 3/1916 | Cole | ............. | G01F 19/002 30/326 |
| 2,042,945 A * | 6/1936 | Lemay | ............. | G01F 19/002 73/426 |
| 2,085,381 A * | 6/1937 | Myers | ............. | A47F 13/08 425/187 |
| 2,420,505 A * | 5/1947 | Stith | ............. | A61C 19/00 222/130 |
| 2,630,014 A * | 3/1953 | Chester | ............. | G01F 19/002 73/429 |
| 5,893,596 A * | 4/1999 | Martin | ............. | A47G 21/10 100/234 |
| D419,037 S * | 1/2000 | Gardner | ............. | D7/672 |
| 6,974,056 B2 * | 12/2005 | Rea | ............. | G01F 19/002 222/460 |
| D554,943 S * | 11/2007 | Stewart | ............. | D7/401.2 |
| 9,055,844 B2 * | 6/2015 | Schuelke | ............. | B65D 25/48 |
| 9,682,851 B2 * | 6/2017 | Rivera | ............. | B67C 11/02 |
| 10,429,225 B2 * | 10/2019 | Warren | ............. | G01F 19/002 |

* cited by examiner

*Primary Examiner* — Charles Cheyney
(74) *Attorney, Agent, or Firm* — Usha Koshy

(57) ABSTRACT

A scoop with a spring action handle comprising a half spherical shaped bottom cup, a funnel shaped top lid having a broad base with a lip to fit over the flat mouth of the bottom cup and an opening at the narrow top end of the lid to dispense ground coffee scooped into the bottom cup. The spring action handle is comprised of an alligator clip front end attached to the bottom cup and the top lid, a pair of hand clasp structures that when flexed together with a single hand separates the bottom cup from the top lid so that ground coffee can be scooped into the bottom cup. When the hand clasp structures are released, the lip of the top lid, covers the mouth of the bottom cup to create a tight seal between the two sections to prevent spillage of the coffee.

3 Claims, 4 Drawing Sheets

SCOOP WITH SPRING ACTION HANDLE

FIELD OF THE INVENTION

The present invention relates generally to utensils for accessing, holding and dispensing granular material. More particularly, the invention relates to a utensil for scooping ground coffee and other powdered material from a container holding the material.

BACKGROUND OF THE INVENTION

Accessing and dispensing granular and powdered material such as ground coffee, sugar and flour from a container requires the use of an ergonomically shaped utensil that has raised sides and a reasonable depth to hold the material intact while scooping the material from the container holding the material. The majority of such utensils generally referred to as measuring spoons or scoops are configured to hold a specific measurement of the scooped material. Ground coffee in particular is generally accessed from a container and dispensed into a coffee maker basket using a scoop with a rounded or conical shaped bottom structure with an open top and an elongated handle affixed to one end of the scoop.

Ground coffee dispensing scoops have evolved from scoops with open tops to ones with the added feature of a lid affixed to the handle or sides of the scoops. U.S. Pat. No. 7,441,676 to Pickering describes a device for dispensing media wherein the body of the dispenser has an elongated handle with a scoop attached to one end of the handle and a funnel-shaped cover with an open spout attached to the body of the dispenser, but not to the handle. U.S. Pat. No. 9,682,851 to Rivera describes a scoop with a funnel moveably attached to the scoop handle through its own handle. U.S. Pat. No. 6,974,056 describes a cup for measuring and dispensing powdered products wherein the cup and a funnel shaped dispenser each have their respective handles with the cup handle attached to the dispenser handle through a connection apparatus. In these prior art measuring devices with lids, the scoop handles are separate from the lid handles. In the present invention of a scoop, the scoop section and the lid section have a common spring action handle enabling the scooping and dispensing of ground coffee and other particulate material with just one hand, thus distinguishing the scoop of the present invention from these prior art scoops.

The present invention of a scoop with a spring action handle is specifically designed to enable the scooping and dispensing of ground coffee. A novel feature of the scoop of the invention that distinguishes the device from the prior art scoops relates to the spring action handle of the scoop which facilitates the creation of a tight seal between the bottom cup of the scoop holding the coffee grinds after scooping and the top lid, preventing the spillage of the coffee from the scoop. The spring action feature of the handle and other features of the scoop of the invention will become obvious to one skilled in the art when viewed in conjunction with the drawings, detailed description of the invention, and the claims.

SUMMARY OF THE INVENTION

The present invention is a scoop for scooping in particular, ground coffee held in a container and dispensing the coffee into reusable coffee pods, or cups used in single serve coffee makers, or the coffee grind holding basket of a standard coffee making machine.

In the exemplary embodiment of the scoop of the invention, the scoop has a bottom cup section and a top lid section with a single spring action handle connecting the two sections. In the exemplary embodiment of the invention, the scoop with the spring action handle mechanism is constructed from stainless steel material. In other embodiments, the scoop and the handle may be constructed from plastic or other suitable materials.

In the embodiments of the scoop of the invention, the top lid section has an upside-down funnel-shaped configuration with a broad open base and a narrow open top. In this embodiment, the broad base of the lid section has a lip that fits over the substantially flat open mouth of the bottom cup section of the scoop to create a tight seal when the two sections are brought together, by the spring action of the scoop handle. In this embodiment, the bottom cup section of the scoop has a substantially round and half spherical shape. In yet other embodiments, the bottom cup section may have a conical, or square shape. In these embodiments, the base of the top lid section may have the appropriate configurations to fit over the mouth of the bottom cup section depending on the shape of the bottom cup section.

In the exemplary embodiment of the scoop of the present invention, the spring action handle of the scoop has an alligator clip configuration at one end of the handle. In this embodiment of the scoop handle, the alligator clip end of the scoop handle is comprised of two right angled triangle structures joined together hingedly at their angled junctions by a screw type attachment. In this embodiment of the alligator clip end of the spring action handle, the front ends of the triangle structures of the alligator clip are attached to the body of the bottom cup section and the body of the lid section. In this embodiment of the handle of the scoop, the distal ends of the triangle structures of the alligator clip end of the handle are hingedly attached to two elongated hand clasping structures which are seamlessly attached to each other at their distal ends to make the scoop a one-handed device. In this embodiment, when the elongated hand clasping structures of the spring action handle of the scoop are flexed and brought into contact with each other, the bottom cup section and the top lid section of the scoop are separated through the flexible action of the alligator clip end of the handle, to allow the coffee grounds to be scooped from a container by the bottom cup section of the scoop. Once the coffee grounds are scooped into the bottom cup section, the elongated hand clasping structures of the handle are released resulting in the lid section forming a cover over the bottom cup section. In this embodiment, the lip of the lid section base forms a cover over the mouth of the bottom section of the scoop to form a tight seal between the two sections to prevent the coffee grinds from spilling.

In the embodiments of the scoop of the invention, the top lid section has an opening at the narrow top of the lid section to allow the dispensing of the scooped ground coffee into a re-fillable coffee pod or, cup of a single server coffee maker, or the basket of a standard, generic coffee machine. In this embodiment of the scoop, the bottom cup section has a capacity to hold approximately two tablespoons of ground coffee which can fill a re-fillable coffee pod, or cup that is used in single serve coffee makers.

In the embodiments of the scoop of the invention, the spring action inherent in the handle of the scoop helps in sustaining a resting tension that facilitates keeping the top lid section over the bottom cup section of the scoop for a tight seal, to prevent spillage of the coffee grinds.

DETAILED DESCRIPTION OF THE INVENTION

The present invention is a scoop specifically designed for scooping and dispensing ground coffee into a coffee making machine to make the beverage. In the exemplary embodiment of the scoop of the invention, the scoop has a spherical bottom cup section and a top funnel-shaped lid section with a single spring action handle connecting the two sections. The exemplary feature of the scoop of the invention is the spring action handle which can be opened and closed with the use of just one hand. An additional feature of the scoop of the invention is that a tight seal between the top lid section and the bottom cup section of the scoop is created when the spring action handle is released after the coffee grounds are scooped into the bottom cup section, thereby preventing spillage of the coffee grounds from the scoop.

Figure 1:
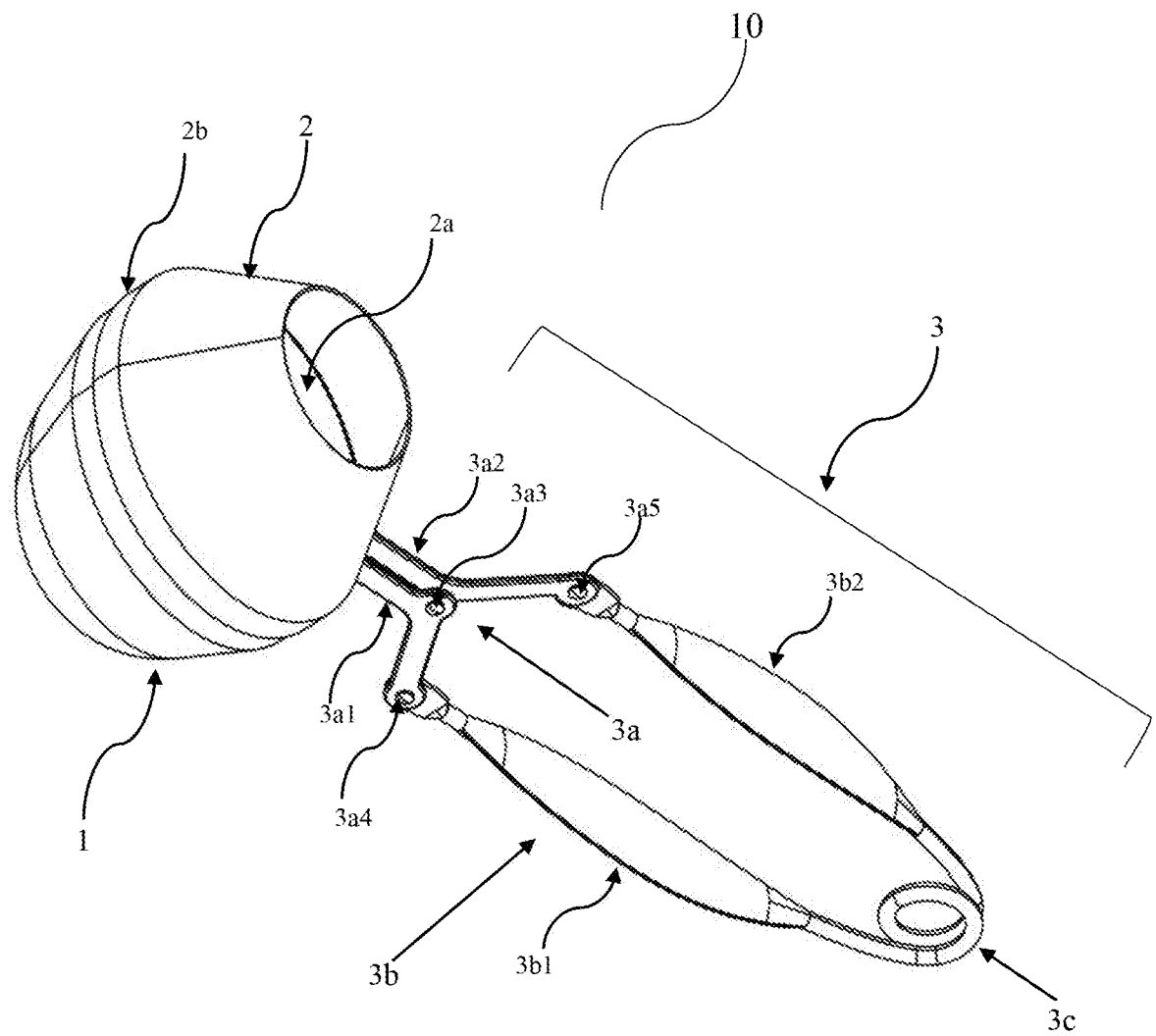
FIG. 1 is a perspective view of the scoop of the present invention.

Referring now to the figures wherein like numerals represent like components in the several views presented and discussed, and more particularly referring now to FIG. 1 the figure, is a perspective view of the scoop 10 of the present invention. The primary parts of the scoop 10 are the bottom cup section 1 the top lid section 2 and the spring action handle 3 having a spring action mechanism. The bottom cup section 1 is half spherical in shape with an open flat top end. In some embodiments the bottom cup section 1 has a plurality of concentric circles around the outside surface of the sphere to provide an ornamental effect. The top lid section 2 has an upside-down funnel shape with an opening 2a at the narrow top end of the structure to dispense the ground coffee into a re-fillable coffee pod, or cup used in single serve coffee making machines, or the basket of a standard coffee machine. In the exemplary embodiment of the scoop 10 of the invention, the capacity of the bottom cup section 1 is approximately, two tablespoons which accommodates just the right quantity of ground coffee that can be dispensed into a re-fillable coffee pod, or cup of a single serve coffee making machine. The mouth of the bottom cup section 1 is flat and has a circumference that is smaller than the base of the funnel shaped lid section 2 so that when the two sections converge, the lip 2b at the base of the top lid section 2 covers the mouth of the bottom cup section 1 to create a tight seal that will prevent the coffee grounds from spilling during the transfer from the coffee holding container to the coffee machine.

Referring again to FIG. 1 the figure also illustrates the design and configuration of the spring action handle 3 of the scoop 10 of the invention. The spring action handle 3 has an alligator clip 3a configuration at the front end of the handle, an elongated flexible hand clasp structure 3b in the middle section of the handle 3 comprising the body of the handle 3 and an interlocking stationary loop section 3c connecting the distal ends of the hand clasp structures 3b1 and 3b2. In this embodiment of the handle 3 the alligator clip 3a has two substantially right angled triangle-shaped structures 3a1 and 3a2 that are joined together hingedly at their right angle intersections by a screw type holder 3a3. In this embodiment of the alligator clip 3a the front end of the right angled triangle-shaped structure 3a1 is attached to a side of the top flat end of the bottom cup section 1 and the front end of the right angled triangle-shaped structure 3a2 is attached to a side of the lip 2b at the broad base end of the top lid section 2 of the scoop 10. In this embodiment of the alligator clip 3a the distal end of the right angled triangle-shaped structure 3a1 is attached hingedly to the front end of the hand clasp structure 3b1 through a screw type holder 3a4 and the distal end of the right angled triangle-shaped structure 3a2 is hingedly attached to the hand clasp structure 3b2 through a screw type holder 3a5. In this embodiment of the handle 3 the distal ends of the hand clasp structures 3b1 and 3b2 are seamlessly attached to each other to form a loop structure 3c to make the scoop 10 a one-handed device. In this embodiment of the scoop 10 when the hand clasp structures 3b1 and 3b2 are flexed and brought into contact with each other at the center of the handle 3 the front ends of the right angled triangle-shaped structures 3a1 and 3a2 of the alligator clip structure 3a attached to the bottom cup section 1 and the lip 2b of the top lid section 2 of the scoop 10 are separated to allow the coffee grounds to be scooped from a container into the bottom cup section 1 of the scoop 10. Once the coffee grounds are scooped into the bottom cup section 1, the handle clasp structures 3b1 and 3b2 of the spring action handle 3 are released by the hand holding the scoop 10 resulting in the lip 2b of the top lid section 2 forming a cover over the mouth of the bottom cup section 1 of the scoop 10 to form a tight seal between the two sections, preventing the spillage of the coffee grounds from the scoop 10. In this embodiment of the scoop 10 of the invention, the ground coffee secured within the bottom cup section 1 is dispensed though the opening 2a of the top lid section 2 into reusable coffee pods, or cups used in a single serve coffee making machine, or alternately into the coffee grind holding basket of a standard coffee machine.

Figure 2:
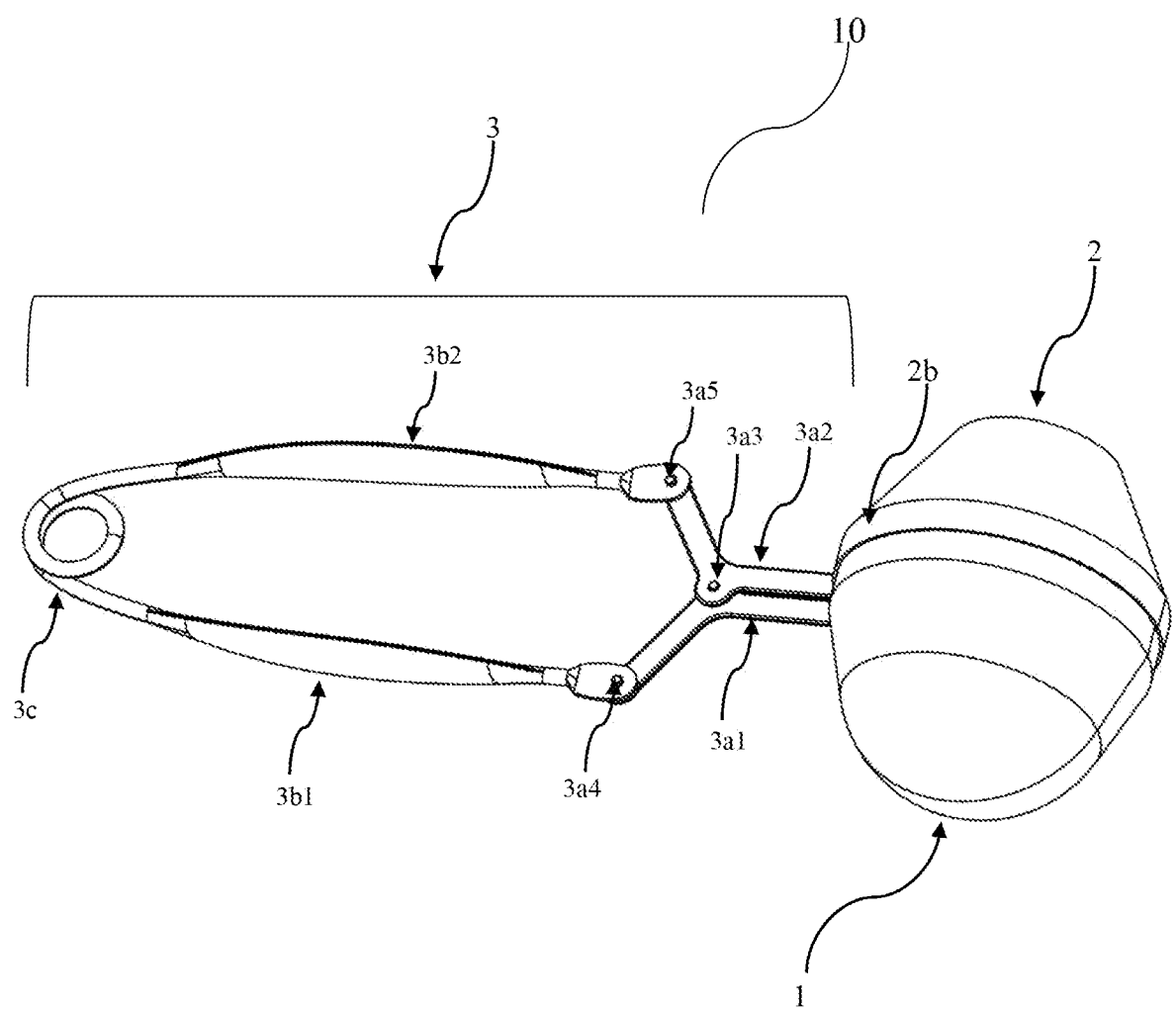
FIG. 2 is a perspective side view of the scoop of the present invention.

FIG. 2 is a perspective side view of the scoop 10 of the present invention. In this view, the mouth of the bottom cup section 1 of the scoop 10 is covered by the broader base lip 2b of the top lid section 2 of the scoop 10 for a tight seal to prevent the coffee grounds from spilling out from the sides of the scoop 10. The spring action handle 3 maintains a resting tension on the scoop 10 head when the top lid section 2 and the bottom cup section 1 are engaged with each other.

Figure 3:
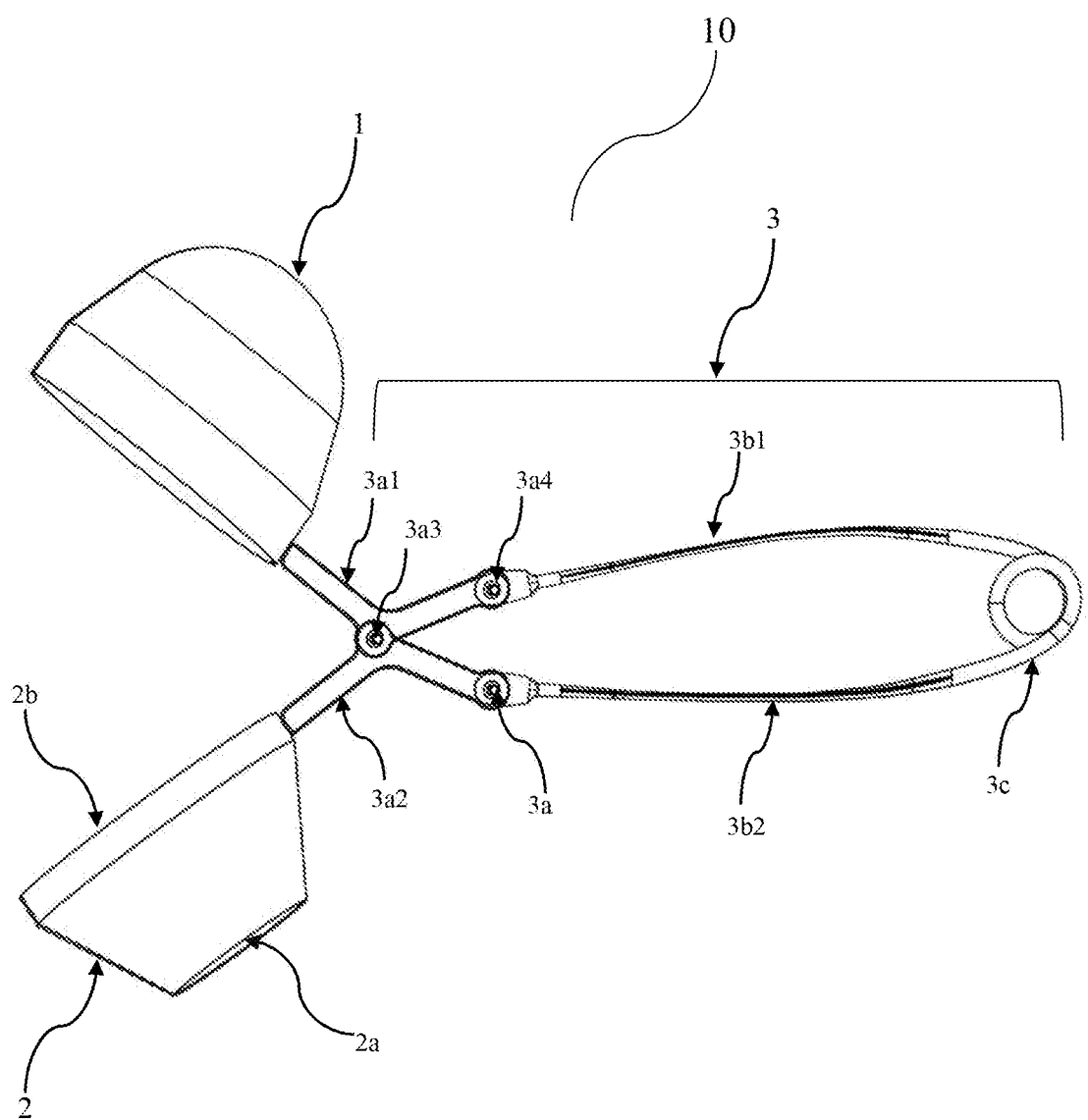
FIG. 3 is a perspective view of the scoop of the present invention in the open conformation.

FIG. 3 is a perspective view of the scoop 10 of the invention illustrating the open positions of the bottom cup section 1 and the top lid section 2. The two sections are opened and separated when the hand clasp structures 3b1 and 3b2 of the spring action handle 3 are flexed and brought in contact with each other at the center of the handle 3 using one hand. The scoop 10 with the bottom cup section 1 and the top lid section 2 in their open positions is then plunged into a coffee grind holding container to scoop the ground coffee, or other particulate material into the bottom cup section 1. Once the ground coffee is scooped into the bottom cup section 1 the hand clasp structures 3b1 and 3b2 are released from their flexed and constricted holdings resulting in the bottom cup section 1 and the top lid section 2 engaging with each other through their openings. When the hand clasp structures 3b1 and 3b2 are released, the lip 2b of the lid section 2 covers the mouth of the bottom cup section 2 to prevent spillage of the ground coffee from the bottom cup section 1.

Figure 4:
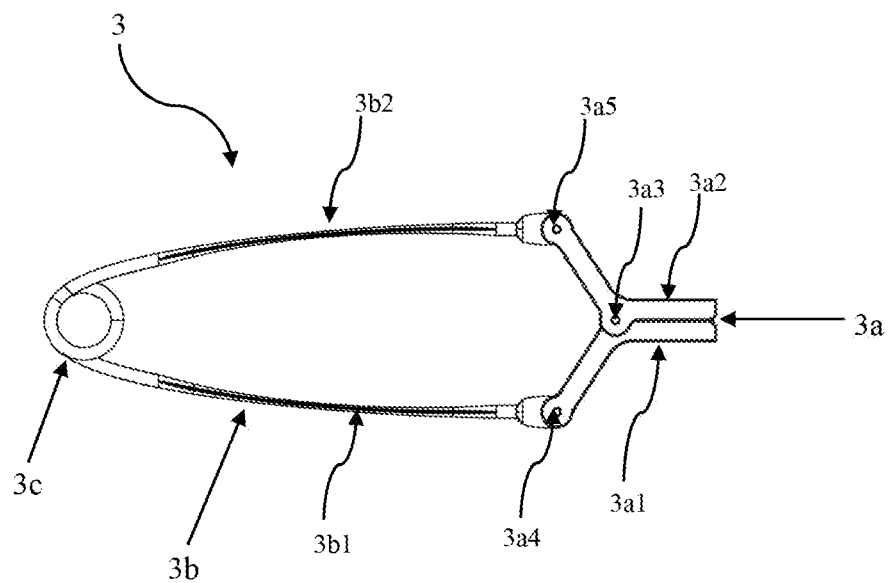
FIG. 4 is a perspective view of the spring action handle of the present invention.
Figure 5:
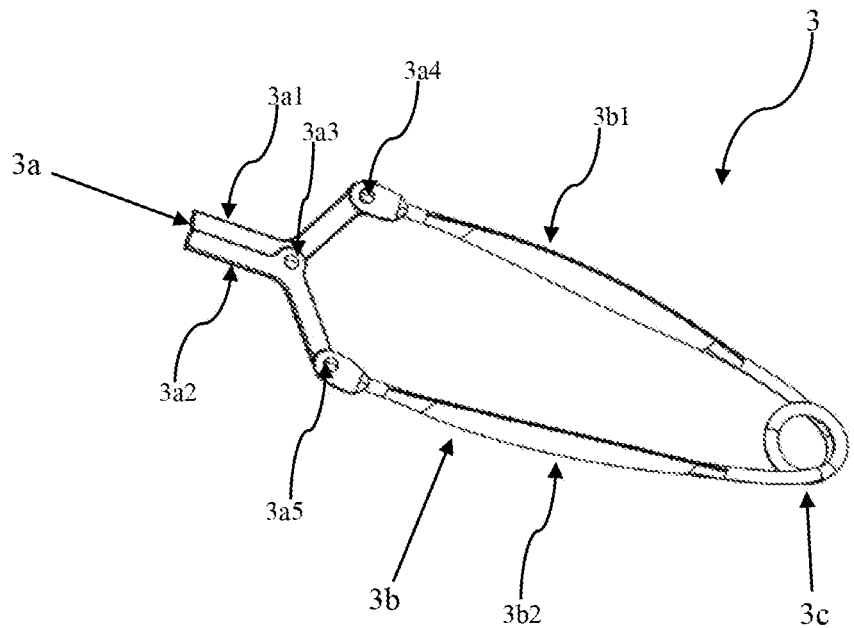
FIG. 5 is another perspective view of the spring action handle of the present invention.

FIG. 4 and FIG. 5 are perspective views of the spring action handle 3 of the scoop of the present invention. FIG. 4 illustrates the spring action handle 3 in repose viewed from one side and FIG. 5 is a view of the spring action handle 3 in repose when viewed from the opposite side. The exemplary features of the spring action handle 3 are the front end alligator clip 3a the middle hand clasp structure 3b comprised of two hand clasp structures 3M and 3b2 and the interlocking stationary structure 3c connecting the hand clasp structures 3b1 and 3b2 at their distal ends to form the one-handed spring action handle 3 of the scoop 10 of the invention.

While the exemplary embodiment of the present invention of a scoop with spring action handle has thus been described through the foregoing specification and the accompanying figures, they should not be construed to limit the scope of the invention. It should be understood and obvious to one skilled in the art that alternatives, modifications, and variations of the embodiments of the present invention may be construed as being within the spirit and scope of the appended claims.

What is claimed is:

1. A scoop with a spring action handle comprising:
   a bottom cup section wherein said bottom cup section is half spherical-shaped with a substantially flat open top end forming a mouth of said bottom cup section;
   a top lid section wherein said top lid section is substantially funnel-shaped with an opening at a top narrow end of said funnel-shaped lid section and an open broad base end having a lip section to cover said mouth of said bottom cup section;
   a handle having a spring action mechanism;
   said bottom cup section and said top lid section hingedly connected to said handle;
   said handle comprising an alligator clip structure at a front end, two elongated hand clasp structures at a middle section and a loop section connecting distal ends of said two elongated hand clasp structures;
   wherein said alligator clip structure having two substantially right angled triangle-shaped structures that are joined together hingedly at their right angle junctions by a first screw type holder 3a3;
   wherein said front end of one of said triangle-shaped structures of said alligator clip structure is attached to a side of said substantially flat open top end of said bottom cup section of said scoop and said front end of a second of said triangle-shaped structures of said alligator clip structure is attached to a side of said lip section at said broad base end of said top funnel-shaped lid section of said scoop;
   wherein a distal end of one of said triangle-shaped structures of said alligator clip structure is hingedly attached to a front end of a first of said elongated hand clasp structures through a second screw type holder 3a4 and a distal end of a second of said triangle-shaped structures of said alligator clip structure is hingedly attached to a front end of a second of said elongated hand clasp structures through a third screw type holder 3a5; and
   wherein, when said two hand clasp structures are flexed and brought into contact with each other at a center of said spring action handle, said front end of said right angled triangle-shaped structures of said alligator clip structure attached to said bottom cup section and said front end of said triangle-shaped structures of said alligator clip structure attached to a side of said lip section at said broad base end of said top lid section are pulled apart, separating said bottom cup section and said top lid section of said scoop to allow coffee grounds to be scooped from a container into said bottom cup section of said scoop and dispensed from said opening at said top narrow end of said funnel-shaped lid section.

2. The scoop with a spring action handle of claim 1 wherein the spring action mechanism inherent in the handle of the scoop helps in sustaining a resting tension that facilitates keeping the top lid section over the bottom cup section of the scoop for a tight seal to prevent spillage of the coffee grinds and other powdered materials and also to keep the lid of the scoop closed over the cup of the scoop when the scoop is in a resting position.

3. A scoop comprising:
   a substantially half spherical-shaped cup with an open flat top end;
   a substantially funnel-shaped lid with an open broad base end configured with a lip and a substantially narrow top end with a small opening;
   wherein said open flat top end of said half-spherical-shaped cup having a narrow circumference than a circumference of said lip on said open broad base end of said funnel-shaped lid so that said lip on said broad base end of said funnel-shaped lid covers said open flat top end of said half spherical-shaped cup to form a tight seal;
   a handle having an alligator clip structure at a front end of said handle and two elongated flexible hand clasp structures connected to distal ends of said alligator clip structure;
   said half spherical-shaped cup and said funnel-shaped lid connected to a front end of said alligator clip structure of said handle;
   said handle comprising an interlocking stationary loop section connecting distal ends of said flexible hand clasp structures;
   wherein when the said two elongated flexible hand clasp structures are flexed together by a single hand of a user, said flexible hand clasp structures are brought in contact with each other at a center of said handle to generate the necessary tension and spring action to separate said half spherical-shaped cup and said funnel-shaped lid attached at said front end of said alligator clip structure to allow powdered material to be scooped from a container into said half spherical-shaped cup of said scoop;
   wherein, when the flexible hand clasp structures are released by said single hand of said user, a second spring action generated by said hand clasp structures through their release makes said half-spherical-shaped cup and said funnel-shaped lid snap back together and form a tight seal between said lip of said funnel shaped lid and said open broad base end of said half spherical-shaped cup to prevent a spillage of said powdered material from said scoop; and
   wherein said powdered material scooped into said half spherical-shaped cup of said scoop is dispensed through said small opening on said narrow top end of said funnel-shaped lid.

* * * * *